United States Patent
Dropps et al.

(10) Patent No.: US 9,094,294 B1
(45) Date of Patent: Jul. 28, 2015

(54) METHODS AND SYSTEMS FOR AN OUT-OF-CREDIT TIMER IN A NETWORK DEVICE

(71) Applicant: QLOGIC, Corporation, Aliso Viejo, CA (US)

(72) Inventors: Frank R. Dropps, Maple Grove, MN (US); Bret E. Indrelee, Edina, MN (US); Leo J. Slechta, Jr., Eagan, MN (US); Gary M. Papenfuss, St. Paul, MN (US); Edward C. Ross, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 337 days.

(21) Appl. No.: 13/678,411

(22) Filed: Nov. 15, 2012

(51) Int. Cl.
*H04J 1/16* (2006.01)
*H04L 12/26* (2006.01)

(52) U.S. Cl.
CPC .................................... *H04L 43/067* (2013.01)

(58) Field of Classification Search
USPC ............ 370/231, 236, 236.1, 236.2, 242–245
See application file for complete search history.

(56) References Cited

U.S. PATENT DOCUMENTS 6,226,296 B1 * 5/2001 Lindsey et al. ............... 370/401
2012/0063304 A1 * 3/2012 Gnanasekaran et al. ...... 370/230

OTHER PUBLICATIONS

"Fibre Channel Framing and Signaling (FC-FS) Rev 1.60", *American National Standard for Information Technology*, (Jan. 18, 2002).
"Fibre Channel Framing and Signaling—3 (FC-FS-3) Rev 1.11", *American National Standard for Information Technology*, (Oct. 22, 2010).

* cited by examiner

*Primary Examiner* — Peter Cheng
(74) *Attorney, Agent, or Firm* — Klein, O'Neill & Singh, LLP

(57) ABSTRACT

Method and system for reporting out-of-credit condition for a network device connected to a network. An indication to an out-of credit logic is provided that a first sub-port operating using a first protocol is out of credit to transmit information from a transmit segment. The first sub-port is a part of a base-port that includes a plurality of sub-ports that can be configured to operate at more than one operating speed to process packets complying with different protocols. The out-of-credit logic determines when the first sub-port is out-of-credit for a threshold period of time, and reports that the sub-port is out-of-credit to a processor of the network device.

15 Claims, 5 Drawing Sheets

METHODS AND SYSTEMS FOR AN OUT-OF-CREDIT TIMER IN A NETWORK DEVICE

BACKGROUND

1. Technical Field

The present disclosure relates to networks and network devices.

2. Related Art

Networking systems are commonly used to move network information (which may also be referred to interchangeably as frames, packets, or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

In one embodiment, a method for reporting out-of-credit condition for a network device connected to a network is provided. The method includes providing an indication to an out-of credit logic that a first sub-port operating using a first protocol is out of credit to transmit information from a transmit segment; wherein the first sub-port is a part of a base-port that includes a plurality of sub-ports that can be configured to operate at more than one operating speed to process packets complying with different protocols; determining when the first sub-port is out of credit for a threshold period of time; and reporting that the sub-port is out of credit to a processor of the network device if there is no credit available to the sub-port within the threshold period of time. The same out-of-credit logic is used to monitor out-of-credit conditions when the first sub-port or a second sub-port is configured to operate using a second protocol.

In another embodiment, a network device element coupled to a network via a network link is provided. The network device includes a processor for executing firmware code for managing network device operations; a plurality of base-ports, where each base-port is coupled to a plurality of network links and each base-port has a plurality of sub-ports configured to operate independently as a port for sending and receiving information using one of the plurality of network links at a plurality of rates complying with a plurality of protocols; and an out-of-credit logic that is provided an indication that a first sub-port operating using a first protocol is out of credit to transmit information from a transmit segment. The out-of-credit logic also determines when the first sub-port is out of credit for a threshold period of time; and reports to the processor that the sub-port is out of credit; wherein the same out-of-credit logic is used to monitor out-of-credit conditions when the first sub-port or a second sub-port is configured to operate using a second protocol.

In yet another embodiment a system having a computing system coupled to a network device is provided. The network device includes: a processor for executing firmware code for managing network device operations; a plurality of base-ports, where each base-port is coupled to a plurality of network links and each base-port has a plurality of sub-ports configured to operate independently as a port for sending and receiving information using one of the plurality of network links at a plurality of rates complying with a plurality of protocols; and an out-of-credit logic that is provided an indication that a first sub-port operating using a first protocol is out of credit to transmit information from a transmit segment; and the out-of-credit logic determines when the first sub-port is out of credit for a threshold period of time; and reports to the processor that the sub-port is out of credit; wherein the same out-of-credit logic is used to monitor out-of-credit conditions when the first sub-port or a second sub-port is configured to operate using a second protocol.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 1 is a functional block diagram of a network that the present embodiments may be used in connection with;

DETAILED DESCRIPTION

Figure 1:
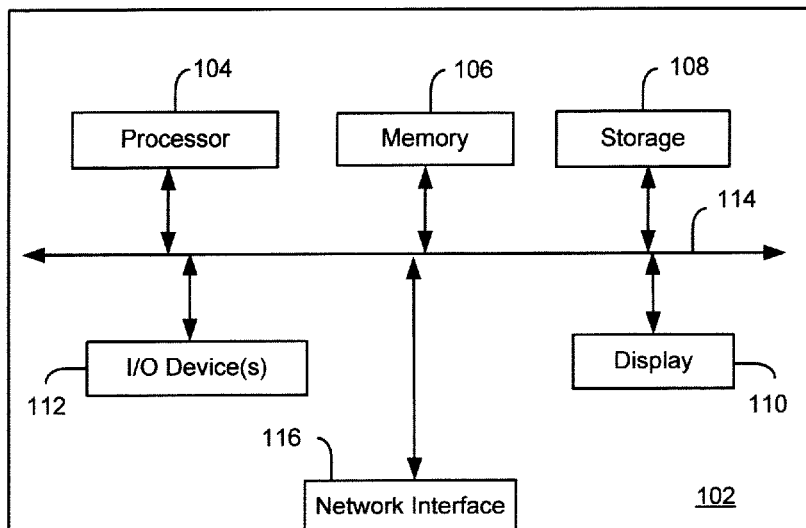

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC). Fibre Channel over Ethernet (FCoE), Ethernet, and others. Below is a brief introduction to some of these standards. The present embodiments are described herein with reference to the Fibre Channel, FCoE, and Ethernet protocols. However, these protocols are used merely for ease of reference and to provide examples. The present embodiments are not limited to Fibre Channel. FCoE, or Ethernet.

Fibre Channel (FC) is a set of American National Standards Institute (ANSI) standards. Fibre Channel provides a serial transmission protocol for storage and network protocols such as HIPPI, SCSI, IP, ATM, and others. Fibre Channel provides an input/output interface to meet the requirements of both Fibre Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network.

Fibre Channel devices use the concept of "credits" for managing flow control when sending and receiving information. Typically, before a transmit port can transmit frames. a receiving port sends credit to the transmitting port indicating the number of frames that the receiving port can hold. The credits are based on the space that may be available at the receiving port at any given time. Thus the transmitting port is only permitted to transmit frames when it has the necessary credits from the receiving port. This prevents situations where the receiving port may overflow with received frames.

Fibre Channel ports use special primitives for providing credits. One such primitive is called an R_RDY that is used by a receiving port to grant credit to a transmit port. Another primitive is a VC_RDY primitive that is used when the receiving port is configured to use virtual lanes (or virtual circuits). Details regarding the use of R_RDYs and VC_RDYs are not germane to the adaptive embodiments disclosed herein.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Ethernet uses "Priority Pause" frames for managing flow control. In Ethernet, a receive buffer may send a Priority Pause frame indicating to the transmitting Ethernet port that it cannot receive a frame. Thus, in this case, implicitly, the transmitting port is out of credit.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet, and cloud computing allows shared resources, for example, software and information, to be available on-demand.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 illustrates an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("UO") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112. for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126. and other devices 124 via a switch element 120 and various links. The network interface 116 may comprise a network interface card (NIC) or any other device for facilitating communication between the host system 102. other computing systems 122, storage devices 126, and other devices 124. The network interface 116 may include a converged network adapter, such as that provided by QLogic Corporation, for processing information complying with storage and network protocols, for example, Fibre Channel and Ethernet. As an example, the network interface 116 may be an FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch ports 128. The term "port" as used herein includes logic and circuitry for receiving, processing, and transmitting information.

Each device (e.g., the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 of the host system 102 and an interface (not shown) of the storage devices 126. Fabric ports are typically located in Fabric devices, such as the switch element 120. Details regarding the switch element 120 are provided below.

Figure 2A:
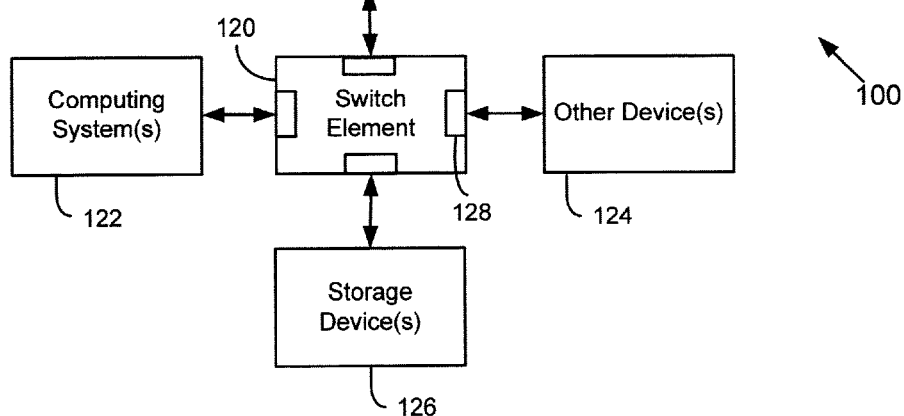
FIG. 2A is a functional block diagram of a switch element according to the present embodiments.
Figure 2A:
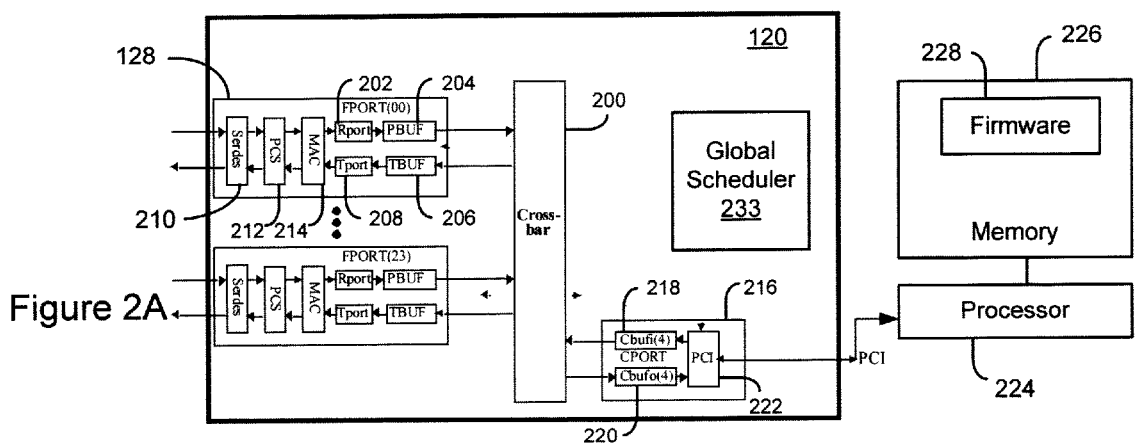

FIG. 2A is a block diagram of switch element 120, also referred to as the switch 120. Switch element 120 may be implemented as an application specific integrated circuit (ASIC) having a plurality of ports 128. Ports 128 are generic (GL) ports and may include an N_Port, F_Port, FL_Port, E-Port, or any other port type. The ports 128 may be configured to operate as Fibre Channel, FCoE, or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time-shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a control port (CPORT) 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time-multiplexed pipeline for receiving frames (or information). The pipeline includes a serializer/deserializer (SERDES) 210. a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202).

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT 208 may share the MAC 214 and the PCS 212 with the RPORT 202. The SERDES 210 at TPORT 208 is used to convert parallel data into a serial stream (the SERDES 210 may also be shared with the RPORT 202).

The switch element 120 may also include the control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently operating sub-ports. each uniquely identified for independently receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port, or one four lane Fibre Channel port. Port 128 uses some logic that is shared among the multiple sub-ports and some logic that is dedicated to each sub-port.

Figure 2B:
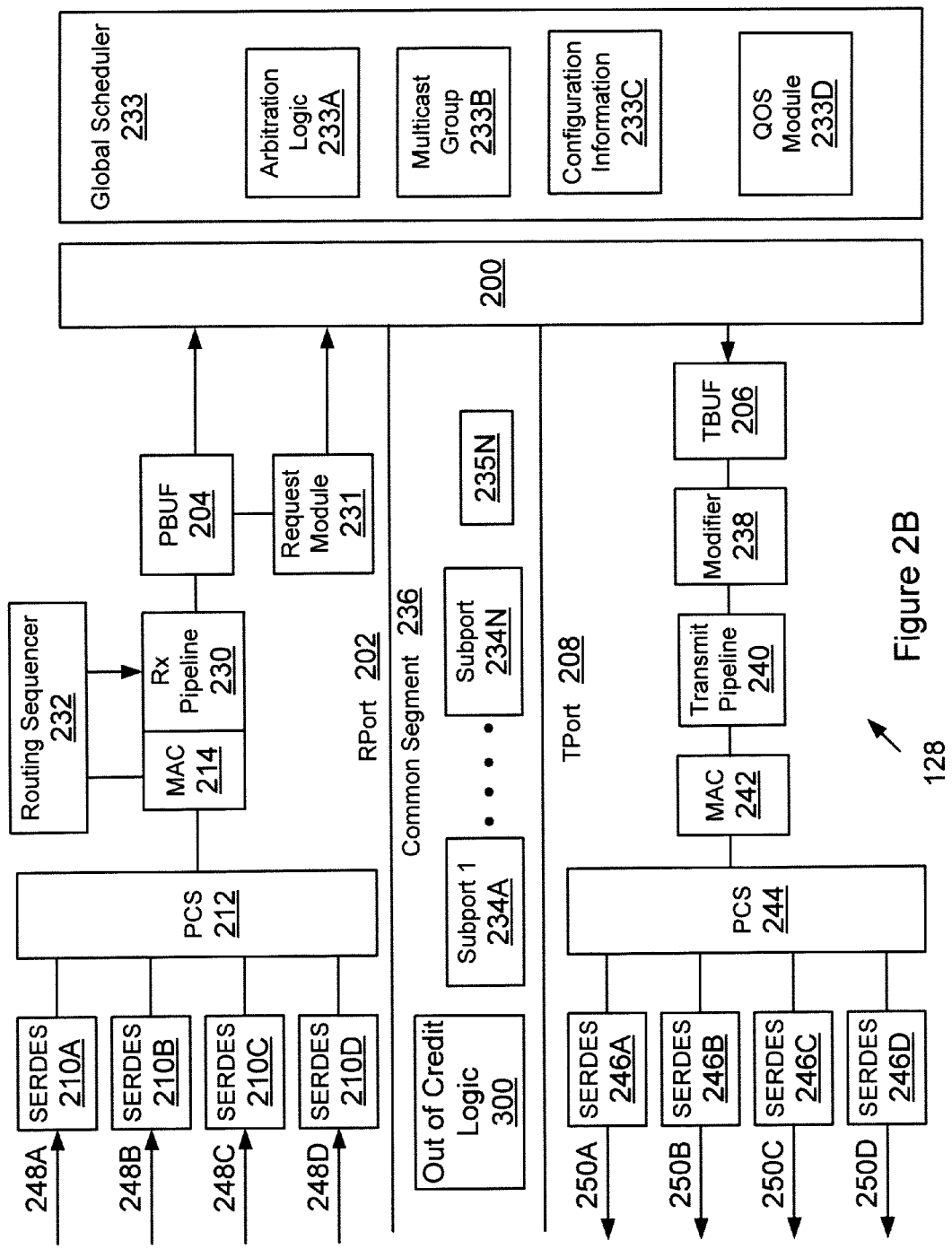
FIG. 2B is a functional block diagram of a port, according to one embodiment.

FIG. 2B illustrates an example of base-port 128 having RPORT 202, TPORT 208, and a common segment 236, according to one embodiment. RPORT 202 is used for receiving and processing frames, while TPORT 208 is used for transmitting frames. Common segment 236 is used to store information that may be commonly used among different components of base-port 128. For example, in one embodiment, base-port 128 may be configured to include a plurality of sub-ports. The configuration information/logic 234A-234N for each sub-port may be stored in common segment 236. Common segment 236 also includes an out-of-credit logic 300 that determines if there is no credit at a receiving port (or sub-port, used interchangeably) within a threshold period of time, and reports an out-of-credit condition to the processor 224, as described below in detail.

RPORT 202 may include or have access to a plurality of network links (or lanes for example, four independent physical network links 248A-248D, each configured to operate as a portion of an independent sub-port within base-port 128. Each network link is coupled to a SERDES 210A-210D that share PCS 212 and MAC 214. The multiple lanes also share a receive pipeline (Rx pipeline) 230 that is used for pre-processing received frames before they are transferred. Both MAC 214 and receive pipeline 230 are time shared so that they can be shared among the plurality of links based on how the ports are configured to operate. MAC 214 and PCS 212 may be a part of receive pipeline 230.

Incoming frames are received via one of the network links 248A-248D. The received frame is processed by the appropriate SERDES 210A-210D and then sent to the PCS 212. As the PCS 212 continues to process a received frame, the frame is provided to MAC 214 that is time shared among a plurality of sub-ports. This means that for a certain time segment (for example, one or more clock cycles). MAC 214 may be used by one of the sub-ports to process the frame. After the MAC module 214 processes the frame, the frame is sent to receive pipeline 230 that is also time shared.

Information regarding the frame or a copy of the frame is also provided to a routing sequencer 232 that determines the destination of the received packets. In one embodiment, a frame whose destination is processor 224 is given the highest priority, followed by a frame that is routed by a TCAM (ternary content addressable memory) or steering registers located within the routing sequencer 232. More than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

When a sub-port is configured to operate as a Fibre Channel port, then credit is issued by the sub-port based on the space that is available at PBUF 204. The sub-port issues R_RDYs or VC_RDYs depending on whether virtual lanes are being used at any given time. When a sub-port is configured to operate as an Ethernet port, credit information based on the space that is available in a receive data buffer (PBUF 204) is conveyed through the transmission of pause frames.

To move frames from the receive queues, a request module 231 generates requests for a global scheduler 233, also referred to as scheduler 233. Request module 231 maintains a data structure (not shown) that tracks a number of requests that may be pending for each sub-port. Request module 231 also removes requests from the data structure when a grant is received for a particular request.

Scheduler 233 stores configuration information 233C for various ports and some of that information may be used to select requests. Scheduler 233 includes arbitration logic 233A that performs dual stage arbitration for processing requests from various base-ports. Scheduler 233 also maintains a data structure at a memory labeled as multicast group 233B. The data structure stores information for identifying multicast groups that may receive multicast frames (i.e., frames that are destined to multiple destinations). Scheduler 233 uses the information for processing requests that involve multicast frames. Scheduler 233 further includes a quality of service (QOS) module 233D that monitors QOS data.

Frames for transmission via TPORT 208 move via TBUF 206 and a modifier 238. In one embodiment, modifier 238 may be used to insert, modify or remove information from an outgoing frame. The modification is based on the frame type and transmit virtual queue. The time shared transmit pipeline 240 and MAC 242 are used to process outgoing frames. PCS 244 and SERDES 246A-246D are used similar to PCS 212 and SERDES 210A-210D. Network links 250A-250D are similar to links 248A-248D, except links 250A-250D are used to transmit frames. Although separate PCS and MAC have been shown for RPORT 202 and TPORT 208, some of the same PCS and MAC logic may be shared and used in the receive and transmit paths, as seen in FIG. 2A.

Figure 2C:
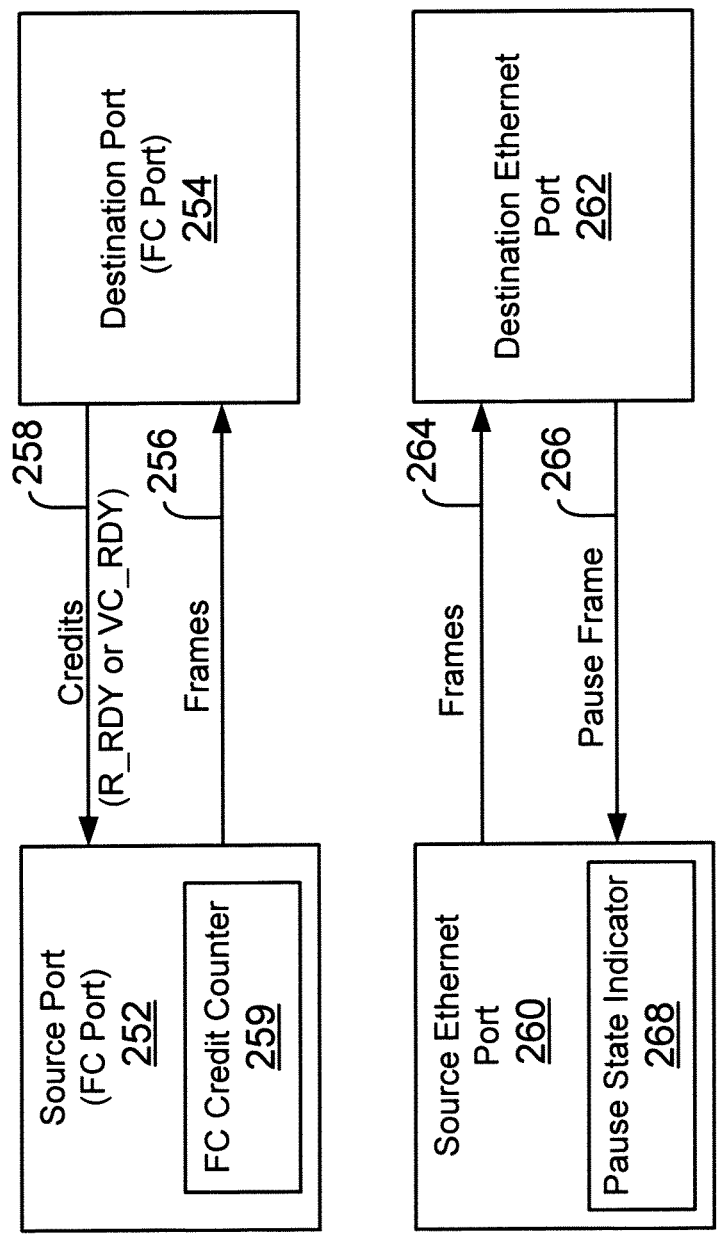
FIG. 2C is a functional block diagram of how credit is used between communicating ports (or sub-ports), according to one embodiment.

FIG. 2C illustrates an example of how credit is used between communicating ports (or sub-ports). In the first example, a port 252 configured to operate as a Fibre Channel port is the transmitting port or the source port. The destination port (or the receiving port) 254 sends credits (R_RDY or VC_RDY primitives) 258 indicating to port 252 that it can receive frames 256. The source port 252 maintains a Fibre Channel credit counter 259 that is decremented every time a frame is sent to port 254. When counter 259 becomes zero, it indicates that port 252 no longer has available credit to transmit frames to port 254. Counter 259 may be at a receive segment (or RPORT 202) of port 252.

The second example illustrates a source Ethernet port 260 configured to transmit frames 264 to a destination port 262. When the destination port 262 cannot receive any more frames, it sends out a pause frame 266. This indicates to port 260 that it no longer has credit to send frames to port 262. Port 260 may maintain a Pause status 268 at a register in a common segment or elsewhere.

Figure 3:
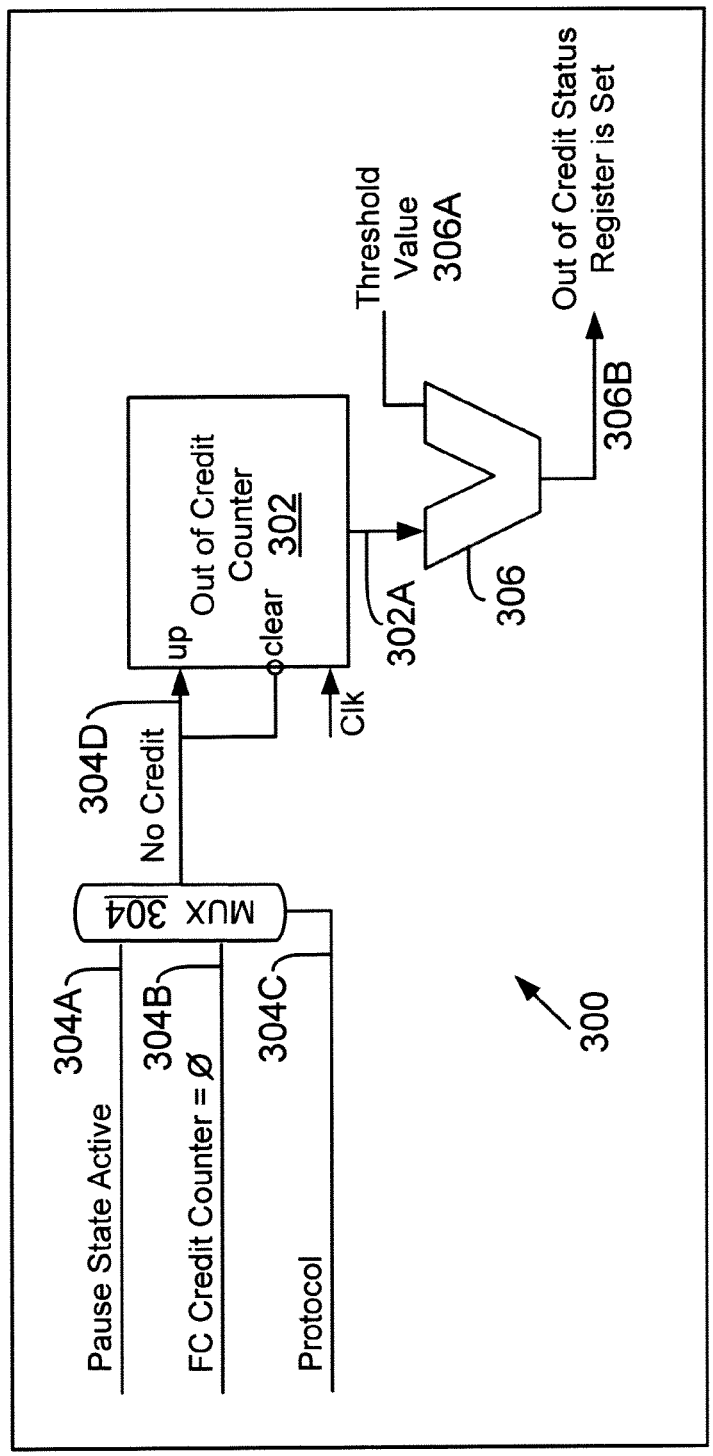
FIG. 3 is a functional block diagram of an out-of-credit logic, according to one embodiment.

FIG. 3 illustrates a block diagram of out-of-credit logic 300, according to one embodiment. which may be located in the common segment 236 of port 128. In one embodiment, each port 128 may use four (4) out-of-credit timers, one for each transmit port physical queue maintained at TBUF 206. Alternatively, frame timeout mechanisms may be used for conditions other than lack of credit that stalls frames in the TBUF 206.

A sub-port of base-port 128 is in an out-of-credit condition when it can no longer transmit frames because it does not have the necessary credits to transmit frames to a particular receive port. When a sub-port is out of credit for an extended period of time, it may be categorized as an error condition. Although the out-of-credit condition can be implied based on a frame timeout condition, the out-of-credit condition can be timed directly to determine how long the sub-port transmitter has actually been without credit. Out-of-credit logic 300 determines if there is no available credit within a threshold period of time, and reports an out-of-credit condition to the processor 224.

To determine if the port 128 is out of credit past the threshold period of time, the out-of-credit logic 300 increases a counter value at an out-of-credit counter 302 if there is no credit at the port 128 and determines if the out of credit counter value has reached a threshold value. The counter 302 is reset upon determination of credit at the port 128 and the same counter 302 is used regardless of the protocol used by the port 128. The out-of-credit counter 302 could be loaded with the threshold value and count down when there is no transmit credit for the sub-port. The counter counts down at a periodic rate until it reaches a value of zero and signals the processor 224, or the sub-port receives transmission credit and then the out-of-credit counter 302 reloads the threshold value. The threshold value is measured in time units such as milliseconds.

Out-of-credit logic 300 includes a multiplexer (MUX) 304 that receives a plurality of inputs 304A-304C. Input 304A indicates that the "Pause" state of a sub-port configured to operate as an Ethernet port is active. The Pause state becomes active when the sub-port configured to operate as an Ethernet port has received a pause frame indicating to the sub-port that it cannot transmit frames to the receiver because it is out of transmit credit (FIG. 2C).

Input 304B provides a signal from Fibre Channel counter 259 (FIG. 2C) indicating that the Fibre Channel credit counter value is equal to zero (0). As described above, when a sub-port is configured to operate as a Fibre Channel port, it maintains the Fibre Channel transmit credit counter for counting credit at the sub-port. The counter 259 is decremented when a frame is sent (i.e., when credit is used). When all the frames are sent, then the credit counter value becomes zero (0), indicating that the sub-port does not have any available transmit credit to transmit any more Fibre Channel frames.

Input 304C indicates the protocol of a sub-port, for example, Ethernet or Fibre Channel. Based on input 304C, Mux 304 selects either 304A or 304B. Depending on the protocol, MUX 304 will receive (or select) input that either a Fibre Channel credit counter is zero (0) or that an Ethernet pause state is active.

The output 304D from MUX 304 is used to increment the out-of-credit counter 302. The counter 302 has an input for an "up count" and an input to "clear" the counter. The counter 302 also receives a clock (CLK) input. The counter 302 is increased (i.e., "counted up") when output 304D indicates that there is no credit.

An output 302A (i.e., the count value of counter 302) from the counter 302 is input to a compare module 306 that compares the output 302A with a programmable threshold value 306A (e.g., two (2) seconds). The range of thresholds may be between about 2 milliseconds and about 10 seconds, for example. The threshold value is loaded into a sub-port configuration register by processor 224. Output 306B from the compare module 306 is generated when the threshold value is reached. Output 306B may be used to set an out-of-credit status register (not shown) that may be located within the common segment 236. Once the out-of-credit register is set, an interrupt may be triggered for processor 224. The processor 224 is notified that an out-of-credit event has occurred and, executing firmware code, thereafter takes diagnostic steps to determine the cause of the out-of-credit condition at the sub-port and/or take corrective action.

Figure 4:
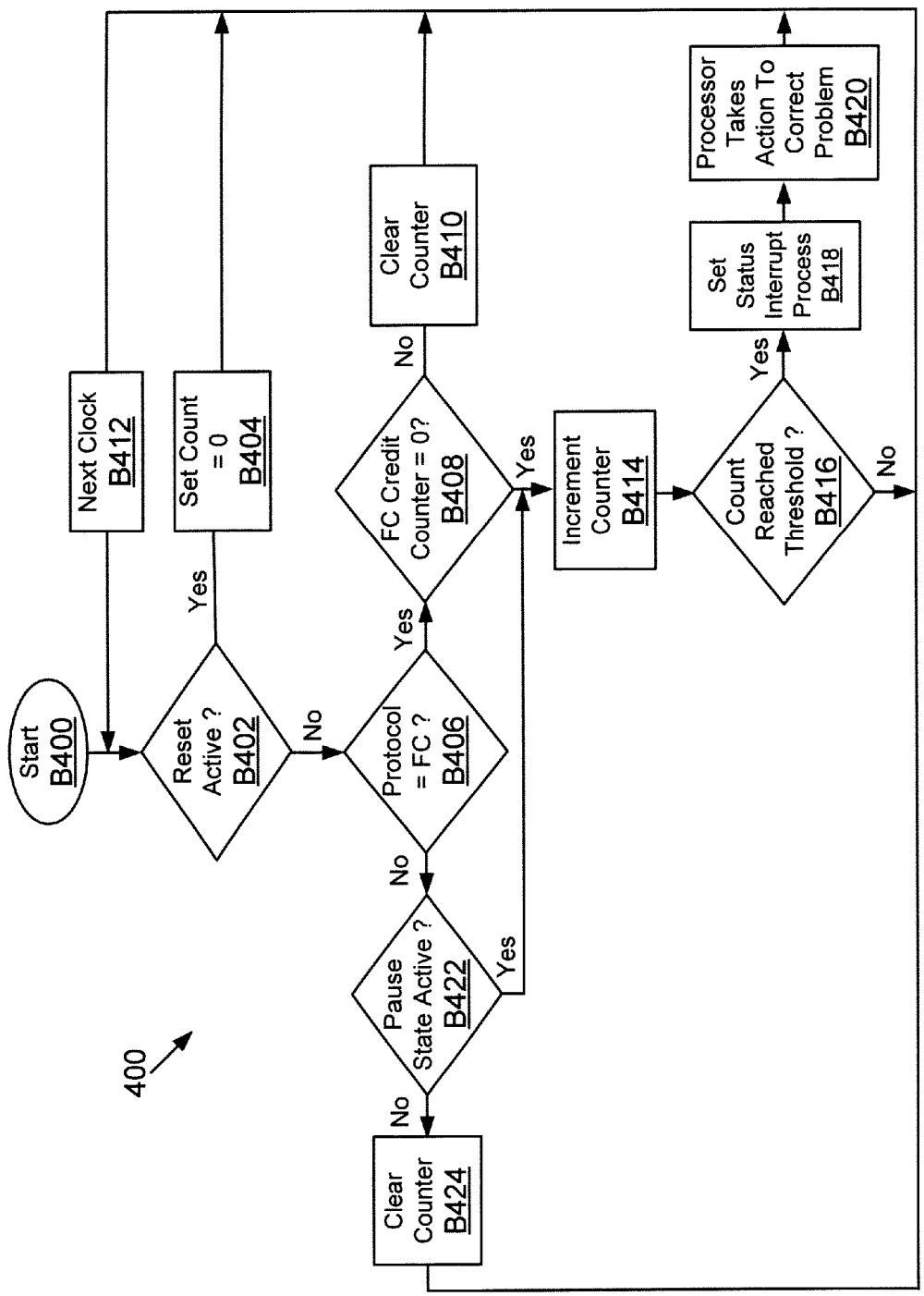
FIG. 4 is a process flow diagram, according to one embodiment.

FIG. 4 illustrates a process 400 for notifying a processor of an out-of-credit situation at a port, regardless of the port protocol, according to one embodiment. The process begins in block B400. In block B402, the process determines if a reset is active. If a reset is active, the count at the counter 302 is set to zero (0) in block B404. Then, in block B412 the process proceeds to the next clock cycle and then loops back to block B402. If a reset is not active in block B402, then in block B406 it is determined if the port protocol is Fibre Channel. If the protocol is determined to be Fibre Channel based on input 304C, then in block B408, it is determined if the Fibre Channel credit counter is set to zero (0) (input 304B of FIG. 3). If it is determined that the Fibre Channel credit counter 259 is not set to zero (0), then in block B410, the counter 302 is cleared and then, in block B412, the process proceeds to the next clock cycle and then loops back to block B402.

If it is determined that the Fibre Channel credit counter is set to zero (0) in block B408, then in block B414 the counter 302 is incremented. In block B416, it is determined if the count in the counter 302 has reached a threshold value. If the count has not reached the threshold value then, in block B412, the process proceeds to the next clock cycle and then loops back to block B402. However, if it is determined in block B416 that the count in the counter 302 has reached or exceeded a threshold value, in block B418, the interrupt process for notifying processor 224 is set. As an example, a dedicated register may be used to store an out-of-credit value. A state machine operating within the common segment 236 may read the register and notify processor 224. Thereafter, processor 224 takes action to diagnose and/or correct the problem in block B420.

Referring back to block B406, if it is determined that the protocol is not Fibre Channel, but Ethernet, then in block B422, it is determined if the pause state is active. If it is determined that the pause state is not active, then in block B424, the counter 302 is cleared and then, in block B412, the process proceeds to the next clock cycle and then loops back to block B402. However, if it is determined in Block 422 that the pause state is active, the process moves to block B414, the counter 302 is incremented and the process proceeds as described above in blocks B416-B420, depending on whether or not the count has reached or exceeded a threshold value.

The embodiments disclosed herein have various advantages. For example, the same set of logic is used to ascertain out-of-credit conditions, regardless of what protocol is being used by the ports. Furthermore, the out-of-credit condition is used as an error condition to notify processor 224 so that action can be taken. In conventional switches, an out-of-credit condition is not used as an error condition.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:
1. A machine-implemented method for reporting an out-of-credit condition for a network device connected to a network, comprising:
providing, by a base-port, an indication to an out-of-credit logic that a first sub-port operating using a first protocol is out of credit to transmit information from a transmit segment; wherein the first sub-port is a part of the base-port that includes a plurality of sub-ports and each sub-port is configured to operate at more than one operating speed to process packets complying with different protocols, and wherein each of the plurality of sub-ports is connected to a dedicated network link and operates using a dedicated hardware component and a shared hardware component of the network device;
determining, by the out-of-credit logic, when the first sub-port is out of credit for a threshold period of time; and
reporting, by the out-of-credit logic, that the first sub-port is out of credit to a processor of the network device when there is no credit available to the first sub-port for at least the threshold period of time; wherein the same out-of-credit logic is used to monitor out-of-credit conditions when a second sub-port is configured to operate using a second protocol,
wherein the first protocol is Fibre Channel and the second protocol is Ethernet or Fibre Channel over Ethernet and any of the plurality of sub-ports is configurable to operate as either a Fibre Channel port, Ethernet or Fibre Channel over Ethernet port and wherein the out-of-credit logic monitors whether a pause state is active for a second threshold period of time when the second sub-port is being monitored.

2. The method of claim 1, wherein the out-of-credit logic includes a counter that is incremented upon receiving the out-of-credit indication.

3. The method of claim 2, wherein the counter is reset upon determination of credit at the first sub-port.

4. The method of claim 2, wherein after the counter is incremented, a value of the counter is compared to a threshold value to determine if the first sub-port has been out of credit for the threshold period of time.

5. The method of claim 1, wherein the network device is a switch element having a plurality of base-ports.

6. A network device element coupled to a network via a network link, comprising:
a processor for executing firmware code for managing network device operations;
a plurality of base-ports, where each base-port is coupled to a plurality of network links and each base-port has a plurality of sub-ports, wherein each sub-port is configured to operate independently for sending and receiving information using one of the plurality of network links at a plurality of rates complying with a plurality of protocols, wherein each of the plurality of sub-ports operates using a dedicated hardware component and a shared hardware component of the network device; and
an out-of-credit logic that is provided an indication that a first sub-port operating using a first protocol is out of credit to transmit information from a transmit segment; and the out-of-credit logic determines when the first sub-port is out of credit for at least a threshold period of time and then reports to the processor that the first sub-port is out of credit; wherein the same out-of-credit logic is used to monitor out-of-credit conditions when the first sub-port or a second sub-port is configured to operate using a second protocol,
wherein the first protocol is Fibre Channel and the second protocol is Ethernet or Fibre Channel over Ethernet and any of the plurality of sub-ports is configurable to operate as either a Fibre Channel port, Ethernet or Fibre Channel over Ethernet port and wherein the out-of-credit logic monitors whether a pause state is active for a second threshold period of time when the second sub-port is being monitored.

7. The network device of claim 6, wherein the out-of-credit logic includes a counter that is incremented upon receiving the indication that the first sub-port is out-of-credit.

8. The network device of claim 7, wherein the counter is reset upon determination of credit at the first sub-port.

9. The network device of claim 7, wherein the out-of-credit logic includes a compare module to compare a value of the counter with a threshold value to determine if the first sub-port has been out of credit for the threshold period of time.

10. The network device of claim 6, wherein the network device is a switch element having a plurality of base-ports.

11. A system comprising:
a computing system; and
a network device coupled to the computing system, the network device including:
a processor for executing firmware code for managing network device operations;
a plurality of base-ports, where each base-port is coupled to a plurality of network links and each base-port has a plurality of sub-ports, wherein each sub-port is configured to operate independently for sending and receiving information using one of the plurality of network links at a plurality of rates complying with a plurality of protocols, wherein each of the plurality of sub-ports operates using a dedicated hardware component and a shared hardware component of the network device; and
an out-of-credit logic that is provided an indication that a first sub-port operating using a first protocol is out of credit to transmit information from a transmit segment; and the out-of-credit logic determines when the first sub-port is out of credit for at least a threshold period of time and then reports to the processor that the first sub-port is out of credit; wherein the same out-of-credit logic is used to monitor out-of-credit conditions when a second sub-port is configured to operate using a second protocol, wherein the first protocol is Fibre Channel and the second protocol is Ethernet or Fibre Channel over Ethernet and any of the plurality of sub-ports is configurable to operate as either a Fibre Channel port, Ethernet or Fibre Channel over Ethernet port and wherein the out-of-credit logic monitors whether a pause state is active for at least a second threshold period of time when the second sub-port is being monitored.

12. The system of claim 11, wherein the out-of-credit logic includes a counter that is incremented upon receiving the indication that the first sub-port is out-of-credit.

13. The system of claim 12, wherein the counter is reset upon determination of credit at the first sub-port.

14. The system of claim 12, wherein the out-of-credit logic includes a compare module to compare a value of the counter with a threshold value to determine if the first sub-port has been out of credit for the threshold period of time.

15. The system of claim 11, wherein the network device is a switch element having a plurality of base-ports.

* * * * *

UNITED STATES PATENT AND TRADEMARK OFFICE
CERTIFICATE OF CORRECTION

| | | |
|---|---|---|
| PATENT NO. | : 9,094,294 B1 | Page 1 of 1 |
| APPLICATION NO. | : 13/678411 | |
| DATED | : July 28, 2015 | |
| INVENTOR(S) | : Dropps et al. | |

It is certified that error appears in the above-identified patent and that said Letters Patent is hereby corrected as shown below:

In the Specification

In column 2, line 67, delete "systems." and insert -- systems --, therefor.

In column 3, line 25, delete "(FC)." and insert -- (FC), --, therefor.

In column 3, line 31, delete "Channel." and insert -- Channel, --, therefor.

In column 3, line 60, delete "frames." and insert -- frames, --, therefor.

In column 4, line 62, delete "("UO")" and insert -- ("I/O") --, therefor.

In column 5, line 21, delete "112." and insert -- 112, --, therefor.

In column 5, line 28, delete "126." and insert -- 126, --, therefor.

In column 5, line 31, delete "102." and insert -- 102, --, therefor.

In column 6, line 25, delete "210." and insert -- 210, --, therefor.

In column 6, line 63, delete "sub-ports." and insert -- sub-ports, --, therefor.

In column 7, line 29, delete "lanes" and insert -- lanes), --, therefor.

In column 7, line 46, delete "cycles)." and insert -- cycles), --, therefor.

In column 8, line 55, delete "embodiment." and insert -- embodiment, --, therefor.

In column 10, line 23, delete "B412." and insert -- B412, --, therefor.

Signed and Sealed this
Twenty-first Day of June, 2016

Michelle K. Lee
*Director of the United States Patent and Trademark Office*